(12) United States Patent
Zhang et al.

(10) Patent No.: US 8,176,937 B2
(45) Date of Patent: May 15, 2012

(54) TEMPERATURE ADJUSTABLE MIXING VALVE

(75) Inventors: Liping Zhang, Nanjing (CN); Huaxin Wan, Nanjing (CN); Bu Qiu, Nanjing (CN); Lan Zhang, Nanjing (CN)

(73) Assignee: AOS Holding Company, Wilmington, DE (US)

( * ) Notice: Subject to any disclaimer, the term of this patent is extended or adjusted under 35 U.S.C. 154(b) by 546 days.

(21) Appl. No.: 12/414,798

(22) Filed: Mar. 31, 2009

(65) Prior Publication Data
US 2009/0242052 A1 Oct. 1, 2009

(30) Foreign Application Priority Data
Mar. 31, 2008 (CN) .......................... 2008 1 0024646

(51) Int. Cl.
*F16K 11/20* (2006.01)
(52) U.S. Cl. ................ 137/597; 137/625.46; 137/601.2; 137/625.41; 137/337
(58) Field of Classification Search .................. 137/597, 137/337, 625.41, 625.46, 625.29, 601.01, 137/601.2, 599.14
See application file for complete search history.

(56) References Cited

U.S. PATENT DOCUMENTS

| | | | | | |
|---|---|---|---|---|---|
| 1,427,606 | A | * | 8/1922 | Leahy | 137/625.12 |
| 2,842,155 | A | * | 7/1958 | Peters | 137/337 |
| 3,002,531 | A | * | 10/1961 | Katva | 137/597 |
| 3,052,414 | A | * | 9/1962 | Fox | 236/12.19 |
| 4,653,538 | A | * | 3/1987 | Tsutsui et al. | 137/625.46 |
| 5,467,799 | A | * | 11/1995 | Buccicone et al. | 137/625.41 |
| 6,012,487 | A | * | 1/2000 | Hauck | 137/625.11 |
| 6,012,488 | A | * | 1/2000 | Nichols | 137/625.11 |
| 6,135,152 | A | * | 10/2000 | Knapp | 137/625.41 |
| 6,352,105 | B1 | * | 3/2002 | Serratto | 165/221 |
| 6,357,476 | B1 | * | 3/2002 | Moretti | 137/597 |
| 6,378,556 | B1 | * | 4/2002 | Fondse | 137/625.48 |
| 6,517,006 | B1 | * | 2/2003 | Knapp | 236/12.2 |
| 6,802,424 | B2 | * | 10/2004 | Ouyoung | 210/447 |
| 6,805,151 | B1 | * | 10/2004 | Chang | 137/270 |
| 6,877,523 | B2 | * | 4/2005 | Dempsey et al. | 137/98 |
| 7,066,204 | B2 | * | 6/2006 | Marty | 137/625.11 |
| 7,377,291 | B2 | * | 5/2008 | Moon et al. | 137/625.46 |
| 2004/0123911 | A1 | * | 7/2004 | Bartkus et al. | 137/625.46 |
| 2006/0037651 | A1 | * | 2/2006 | Yang | 137/625.41 |
| 2006/0162793 | A1 | * | 7/2006 | Di Nunzio | 137/625.46 |
| 2007/0137709 | A1 | * | 6/2007 | Kempf et al. | 137/337 |

FOREIGN PATENT DOCUMENTS

CN 2311663 Y 3/1999

* cited by examiner

*Primary Examiner* — John Rivell
*Assistant Examiner* — Minh Le
(74) *Attorney, Agent, or Firm* — Michael Best & Friedrich LLP

(57) ABSTRACT

A temperature adjustable water mixing valve having a cold water inlet, a cold water outlet, a hot water inlet, a mixing water outlet, and a valve core configured to open or close water channels. The temperature adjustable water mixing valve further includes a pressure relief channel between the cold water inlet and a port connected with a water storage device. The channel is equipped with a check valve allowing water to flow from the water storage device to the cold water inlet. The temperature adjustable water mixing valve opens the check valve to discharge toward the front-end water source when the inner pressure in the water storage device is high.

13 Claims, 3 Drawing Sheets

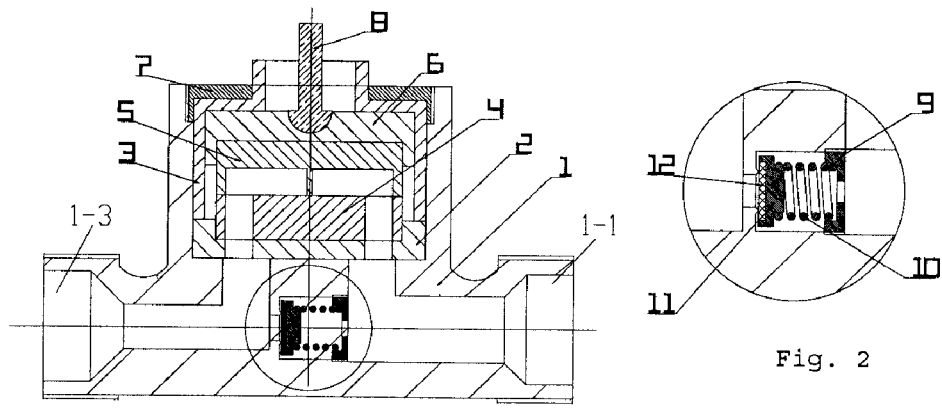
Fig. 2
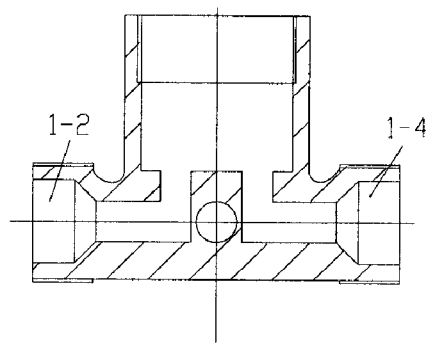
Fig. 1
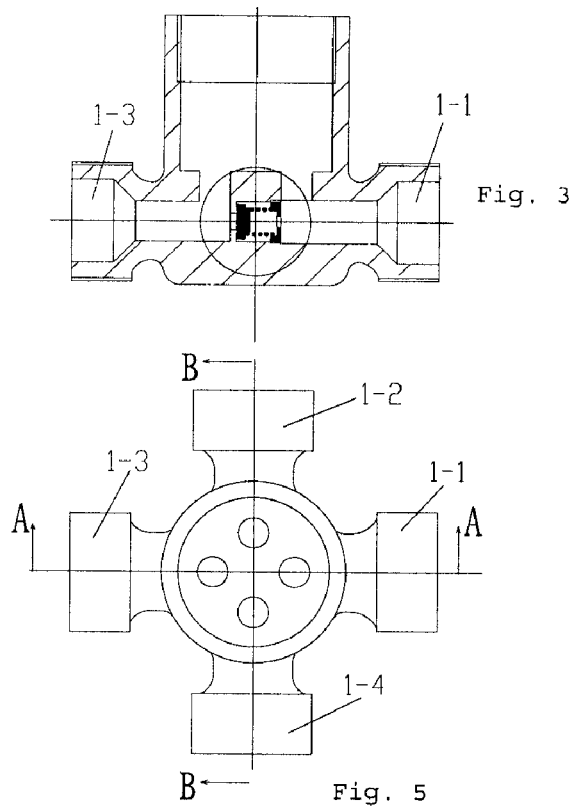
Fig. 3
Fig. 4
Fig. 5

TEMPERATURE ADJUSTABLE MIXING VALVE

CROSS-REFERENCE TO RELATED APPLICATIONS

The application claims priority to Chinese Patent Application No. 200810024646.8, filed Mar. 31, 2008, the entire contents of which are incorporated herein by reference.

BACKGROUND

The present invention relates to a temperature adjustable water mixing valve for fluid control applications.

Water mixing valves are used widely in water flow adjusting and water control fluid applications. The existing single-handle water mixing valves normally have three ports: hot water, cold water and mixing water. The water flow channel is changed by an internal valve core that turns on or off mixing water and temperature adjusting, such as disclosed in Chinese Utility Model Patent No. 97224630.4. A single port and a composite port are formed in different level planes, on two sides of an enclosure, respectively. The surface of the valve core has a water temperature adjusting slot with varying sections parallel to the rotation direction of the valve core. A through-hole is inside the slot with an opening through the valve core. The valve is used for water heater applications such as storage, outlet opened, opened, closed type, and for integrating the switches of cold water, hot water and mixing water together with the same valve core.

However, the existing water mixing valve as a terminal valve can only control the outlet water and cannot control the flow channel between the front-end water source and storage devices. Although the water mixing valve of the Chinese Utility Model Patent No. 97224630.4 cuts off the flow channel between the water source and storage devices, the storage devices do not discharge if the pressure is too high.

SUMMARY

In one embodiment, the invention provides a temperature adjustable water mixing valve that can control the front-end water flow and also control the internal pressure in water storage devices, thus ensuring the safe usage of the water storage devices and resistance to leaks.

To solve the above technical problem, the basic technical scheme of the temperature adjustable valve of the invention includes an enclosure having a cold water inlet used to connect a water source, a cold water outlet used to connect a water storage device, a hot water inlet used to connect a water outlet of the water storage device, and a mixing water outlet used to connect water using devices. A valve core is installed in the enclosure to open and close, or otherwise switch water channels. In the valve core, water flow channels connect the cold water inlet with the cold water outlet, connect the cold water inlet with the mixing water outlet, and connect the hot water inlet with the mixing water outlet, respectively. A pressure relief channel extends between the cold water inlet and one of the ports connected with the water storage device. The channel is equipped with a check valve to allow water to flow from the water storage device to the cold water inlet.

In this way, the temperature adjustable water mixing valve not only retains the function of switching on or off water and adjusting water temperature, but can open the check valve to discharge toward the front-end water source when the inner pressure in the water storage device is too high when the water mixing valve is off. Therefore, the usage of the water storage device is enhanced by resisting leaks from overpressure, which beneficially prolongs the utility life. Meanwhile, even in the case of a water storage device leak, a large amount of water leakage will not occur because the check valve does not let water flow from the cold water inlet to the water storage device through the pressure relief channel.

In another embodiment, the temperature adjustable mixing valve provides that when the valve is off, there is no water at the mixing water outlet. The valve core cuts off communication between the cold water inlet and the cold water outlet, between the cold water inlet and the mixing water outlet, between the hot water inlet and the mixing water outlet, and thereby, water can only flow to the water source through the check valve described above. When the valve is on, water exits the mixing water outlet, and the cold water inlet and the cold water outlet are in fluid communication. Water temperature is adjusted by regulating the yielding water proportion between the cold water inlet and the mixing water outlet, as well as the yielding water proportion between the hot water inlet and the mixing water outlet.

More specifically, the valve core of the invention has four positions for switching water channels. When the valve is in a first position, the channels among all the ports are cut off. When the valve core is advanced from the first position to the second position, the cold water inlet and cold water outlet are in fluid communication with the mixing water outlet, and the hot water inlet begins to fluidly communicate with the mixing water outlet, progressively. When the valve core is advanced from the second position to the third position, the cold water inlet and the cold water outlet are in fluid communication and begin to close with respect to the mixing water outlet, progressively. The hot water inlet and the mixing water outlet are also in fluid communication. When the valve core is advanced from the third position to the fourth position, the cold water inlet and cold water outlet are in gradual fluid communication with the mixing water outlet, and the hot water inlet is shut off.

Control of the temperature adjustable water mixing valve is increased due to the temperature adjustable mixing valve of the present invention. When the temperature adjustable water mixing valve is off, all the ports are shut off and no water exits the mixing water outlet. When the water pressure in the water storage device is higher than the water source pressure, the device will relieve pressure to the water source through the check valve. When the water pressure in the device is lower than the water source pressure, the water source cannot supply water to the device.

When the temperature adjustable water mixing valve is on, water can flow from the mixing water outlet, and the yielding water temperature can be adjusted by regulating the temperature of the admitting cold water and the admitting hot water. If only cold water is needed from the water mixing valve outlet, the cold water inlet and the mixing water outlet communicate, and the hot water inlet is not in communication with the other ports. When mixing water is needed from the water mixing valve outlet whose temperature is intermediate the cold water and the hot water, the cold water inlet and outlet communicate with the mixing water outlet, and the hot water inlet communicates with the mixing water outlet. When only hot water is needed from the mixing water outlet, the cold water inlet and outlet communicate, the cold water inlet and the mixing water outlet do not communicate, and the hot water inlet communicates with the mixing water outlet.

Other aspects of the invention will become apparent by consideration of the detailed description and accompanying drawings.

BRIEF DESCRIPTION OF THE DRAWINGS

The invention will be further explained in accordance with the attached drawings.

FIG. 1 is a schematic structure of one embodiment of the invention.

FIG. 2 is the partial enlarged detail of FIG. 1.

FIG. 3 is a sectional view of line A-A of the enclosure in FIG. 5.

FIG. 4 is a sectional view of line B-B of the enclosure in FIG. 5.

FIG. 5 is a top view of the enclosure in FIG. 1

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiment 1

Figure 6:
FIG. 6 is a schematic drawing of the structure of a lower ceramic chip of the valve core in FIG. 1.
Figure 8:
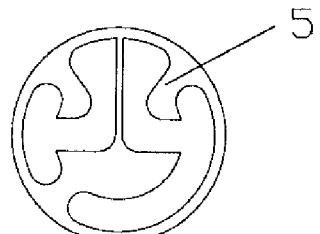
FIG. 8 is a schematic drawing of the structure of an upper ceramic chip of the valve core in FIG. 1.
Figure 7:
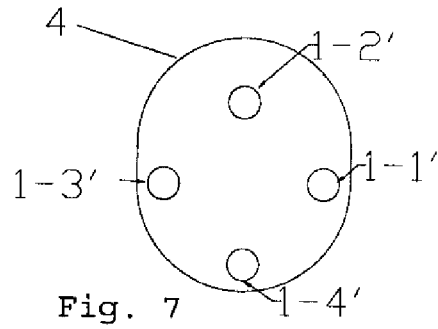
FIG. 7 is a top view of FIG. 6.
Figure 9:
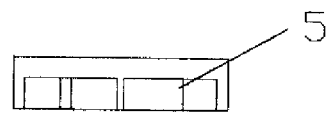
FIG. 9 is a top view of FIG. 8.

FIG. 1 shows a temperature adjustable water mixing valve according to one embodiment of the present invention. As shown in FIGS. 3-5, enclosure or valve body 1 has a cold water inlet 1-1 for connecting with a water source (not shown), a cold water outlet 1-2 for connecting with a water inlet of the storage device (not shown), a hot water inlet 1-3 for connecting an outlet of the storage device (not shown), and a mixing water outlet 1-4 for connecting with water-using devices (not shown). The four ports are in fluid communication with the four neighboring holes in enclosure 1, respectively. A valve core 3 is installed in enclosure 1 for opening and closing, or otherwise switching water flow channels. The valve core is mainly composed of a lower ceramic chip 4 fixed in enclosure 1, an upper ceramic chip 5 fixed relative to an upper ceramic chip fastener 6 and moveable (rotation and translation) relative to the lower ceramic chip in a plane, and a regulation lever 8 disposed on the upper end of the upper ceramic chip fastener 6. FIG. 7 shows a location piece for the valve core. FIG. 2 shows a flow channel for pressure relieving between the cold water inlet 1-1 of enclosure 1 and hot water inlet 1-3 connected with the storage device. The channel is composed of a small hole near the hot water inlet 1-3 and a bigger hole near the cold water inlet. In the hole, a seal 12, a seal support 11, a spring 10 and a fixation piece 9 are installed in order from inside to outside, constituting a check valve that only allows water to flow from the storage device to the cold water inlet.

FIGS. 6-9 show the upper and lower ceramic chips in valve core 3. The lower ceramic chip is elliptical with four through-holes corresponding to four holes, respectively, in enclosure 1. The upper ceramic chip is round with two flow slots on the left and right sides in the bottom plane relative to the lower ceramic chip. The left flow slot includes a short arc slot extending toward the second and third quadrants, and a right angle slot communicating with the short arc slot and extending along an X-axis and then along a positive Y-axis. The right flow slot is composed of a short arc slot extending toward the first quadrant, a long arc slot which passes through the fourth quadrant, then extends toward the third quadrant, and a right angle slot which communicates with the long slot, extending first along the X-axis then along the positive Y-axis. The two ceramic chips are rotated and moved by the regulation level 8 and their relative motions make the valve core 3 have four states for switching the flow channels.

Figure 10:
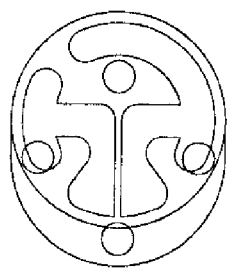
FIGS. 10-13 are schematic drawings of the four positions of the upper and lower ceramic chips of the embodiment of FIG. 1.
Figure 11:
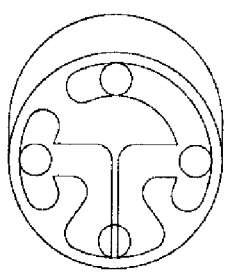
Figure 12:
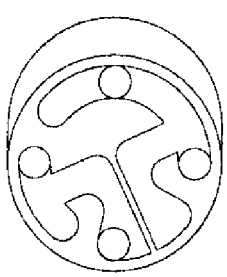
Figure 13:
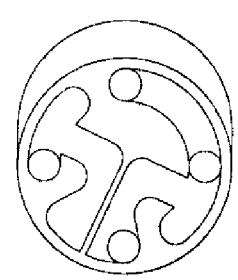
Figure 14:
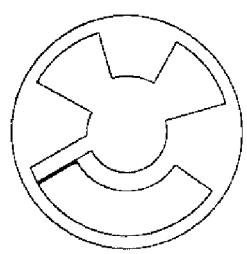
FIG. 14 is a schematic drawing of the structure of the upper ceramic chip in another embodiment of the invention.
Figure 15:
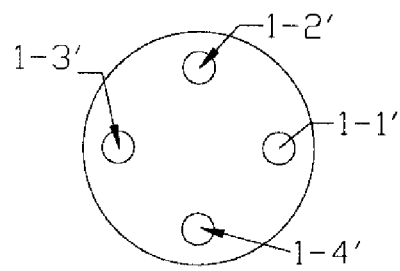
FIG. 15 is a top view of FIG. 14.
Figure 16:
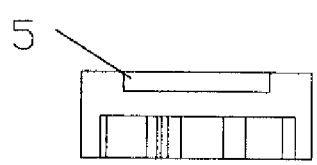
FIG. 16 is a schematic drawing of the structure of the lower ceramic chip in the embodiment of FIG. 4.
Figure 17:
FIG. 17 is a top view of FIG. 16.
Figure 18:
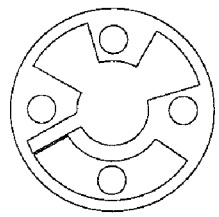
FIGS. 18-21 are schematic drawings of the four positions of the upper and lower ceramic chips in the embodiment of FIG. 14.
Figure 19:
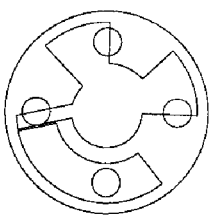
Figure 20:
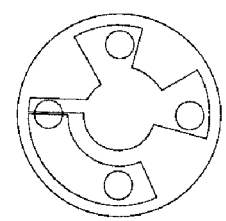
Figure 21:
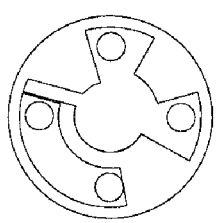

When the valve is in the first position, as shown in FIG. 10, the channels among all the ports are cut off. When the valve core is advanced from the first position to the second position, as shown in FIG. 11, the cold water inlet and cold water outlet are in fluid communication with the mixing water outlet, and the hot water inlet begins to fluidly communicate with the mixing water outlet, progressively. When the valve core is advanced from the second position to the third position, as shown in FIG. 12, the cold water inlet and cold water outlet are in fluid communication, the mixing water outlet is shut off, and the hot water inlet begins to fluidly communicate with the mixing water outlet. When the valve core is advanced from the third position to the fourth position, as shown is FIG. 13, the cold water inlet and the cold water outlet begin to fluidly communicate with the mixing water outlet, progressively, and the hot water inlet is shut off.

In this embodiment, the pressures of the storage device and the water source are substantially due to the check valve, thus not only the switching on or off and temperature adjusting functions of the temperature adjustable water mixing valve remain, but the storage device may relieve to the front-end water source when the pressure inside is too high, ensuring the safe use of the water storage device and enhanced resistance to leaks due to overpressure.

Embodiment 2

Figure 22:
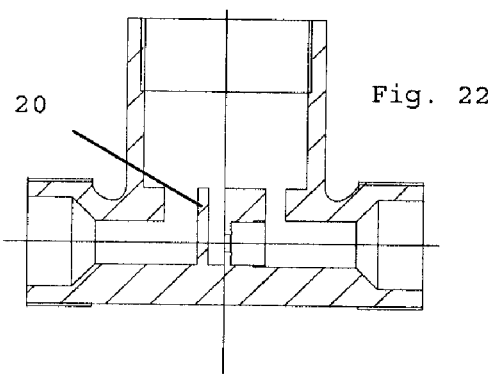
FIG. 22 is a sectional view of line A-A of the enclosure in FIG. 24.
Figure 23:
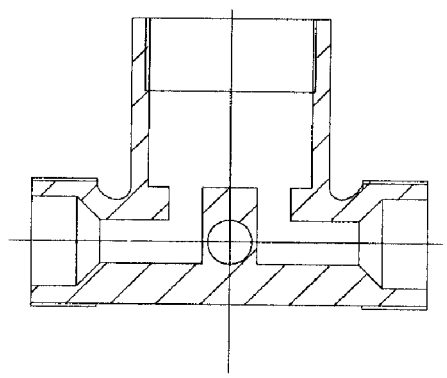
FIG. 23 is a sectional view of line B-B of the enclosure in FIG. 24.
Figure 24:
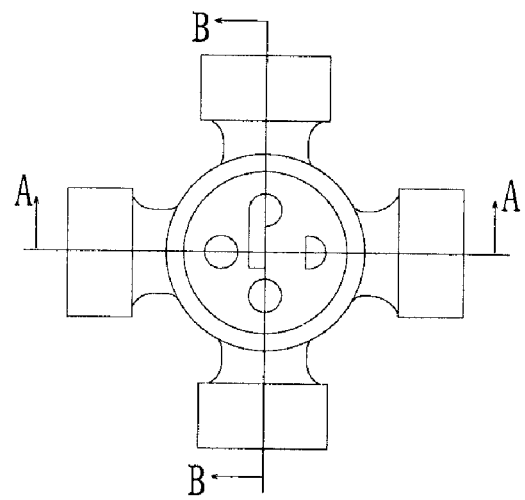
FIG. 24 is the top view of the enclosure of one embodiment of the invention.

The temperature adjustable water mixing valve of Embodiment 2 is substantially similar to the temperature adjustable water mixing valve of Embodiment 1. As shown in FIGS. 22-24, the difference is that the neighboring hole in the enclosure corresponding to the cold water outlet 1-2 has a stern notch 20 extending to the midst, thus forming a pressure relief channel between the cold water inlet 1-1 and the cold water outlet 1-2 connected with the water storage device.

In order to realize the similar regulation control as Embodiment 1, the upper and lower ceramic chips and their regulation operation also change. FIGS. 14-17 show the changes to the upper and lower ceramic chips. The two chips are both circular with four through-holes on the lower chip corresponding to the four holes in enclosure 1. The upper ceramic chip is round with two flow slots with shapes in the bottom plane relative to the lower ceramic chip, both on the top and bottom sides. The flow slot on the top is composed of a section extending to the midst of the first and the second quadrants from the center circle and a right angle slot extending to the midst of the third quadrant. The flow slot at the bottom is composed of arc slots extending respectively to the third and fourth quadrants. When in use, the four states of the flow channels are shown respectively in FIGS. 10-21. The working theory is not difficult to be derived from Embodiment 1, so it will not be explained in detail.

The invention may be implemented in other ways rather than the above embodiments. For instance, there are a variety of designs for the flow channels in the enclosure and the valve core. The technical schemes that are formed by employing the equal replacements or equivalent transformations are both within the scope of the invention.

Various features and advantages of the invention are set forth in the following claims.

What is claimed is:

1. A temperature adjustable water mixing valve, the temperature adjustable water mixing valve comprising:
   a cold water inlet configured to be connected to a water source;
   a cold water outlet configured to be connected to a hot water storage device;
   a hot water inlet configured to be connected to a water outlet of the hot water storage device;
   a mixing water outlet configured to be connected to a water using device; and
   a valve core to open or close water channels;
   a pressure relief channel between the cold water inlet and the hot water inlet; and
   a check valve in the pressure relief channel, the check valve allowing water to flow from the hot water storage device to the cold water inlet,
   wherein the valve core includes water flow channels connecting the cold water inlet with the cold water outlet, connecting the cold water inlet with the mixing water outlet, and connecting the hot water inlet with the mixing water outlet.

2. The temperature adjustable water mixing valve of claim 1 wherein when the valve is off, there is no water at the mixing water outlet,
   wherein the valve core cuts off fluid communication between the cold water inlet and the cold water outlet, between the cold water inlet and the mixing water outlet, and between the hot water inlet and the mixing water outlet,
   wherein water flows to the water source through the check valve, and
   wherein when the valve is on, water exits the mixing water outlet, the cold water inlet and the cold water outlet are in fluid communication, and water temperature is adjusted by regulating a yielding water proportion between the cold water inlet and the mixing water outlet as well as between the hot water inlet and the mixing water outlet.

3. The temperature adjustable water mixing valve of claim 1, further comprising an enclosure, wherein the valve core includes a lower ceramic chip fixed in the enclosure, an upper ceramic chip fixed with respect to a fixation piece moveable with the lower ceramic chip in a first plane, and a regulating rod disposed on an upper end of the fixation piece of the upper ceramic chip.

4. The temperature adjustable water mixing valve of claim 3 wherein the cold water inlet, the cold water outlet, the hot water inlet, and the mixing water outlet fluidly communicate with four neighboring holes in the enclosure.

5. The temperature adjustable water mixing valve of claim 4 wherein the lower ceramic chip is elliptical with four through-holes corresponding to the four holes in the enclosure,
   wherein the upper ceramic chip is round with two flow slots on a left and right relative to a bottom surface of the lower ceramic chip,
   wherein the flow slot on the left includes an arc slot extending to a second and third quadrants and a right angle slot communicating with the arc slot and extending along a X-axis and a positive Y-axis, and
   wherein the flow slot on the right includes an arc slot extending to a first quadrant, another arc slot extending to the third quadrant, and a right angle slot communicating with the another arc slot and extending along the X-axis and the positive Y-axis.

6. The temperature adjustable water mixing valve of claim 4 wherein the upper and lower ceramic chips are round,
   wherein the lower ceramic chip has four through-holes corresponding to the four holes in the enclosure,
   wherein the upper ceramic chip has two flow slots at a top and bottom relative to an upper surface of the lower ceramic chip,
   wherein the flow slot at the top includes sectors extending from a center circle to a middle of the first and the second quadrant and a right angle slot extending to a middle of the third quadrant, and
   wherein the flow slot at the bottom is composed of arc slots extending to the third and fourth quadrants.

7. A temperature adjustable water mixing valve, the temperature adjustable water mixing valve comprising:
   a cold water inlet configured to be connected to a water source;
   a first port and a second port, each configured to be connected to a hot water storage device, wherein the first port is a cold water outlet and the second port is a hot water inlet;
   a mixing water outlet configured to be connected to a water using device; and
   a valve core to open or close water channels;
   a pressure relief channel between the cold water inlet and one of the ports connected with the hot water storage device; and
   a check valve in the pressure relief channel, the check valve allowing water to flow from the hot water storage device to the cold water inlet,
   wherein the valve core includes water flow channels connecting the cold water inlet with the cold water outlet, connecting the cold water inlet with the mixing water outlet, and connecting the hot water inlet with the mixing water outlet.

8. The temperature adjustable water mixing valve of claim 7 wherein when the valve is off, there is no water at the mixing water outlet,
   wherein the valve core cuts off fluid communication between the cold water inlet and the cold water outlet, between the cold water inlet and the mixing water outlet, and between the hot water inlet and the mixing water outlet,
   wherein water flows to the water source through the check valve, and
   wherein when the valve is on, water exits the mixing water outlet, the cold water inlet and the cold water outlet are in fluid communication, and water temperature is adjusted by regulating a yielding water proportion between the cold water inlet and the mixing water outlet as well as between the hot water inlet and the mixing water outlet.

9. The temperature adjustable water mixing valve of claim 7, further comprising an enclosure, wherein the valve core includes a lower ceramic chip fixed in the enclosure, an upper ceramic chip fixed with respect to a fixation piece moveable with the lower ceramic chip in a first plane, and a regulating rod disposed on an upper end of the fixation piece of the upper ceramic chip.

10. The temperature adjustable water mixing valve of claim 9 wherein the cold water inlet, the cold water outlet, the hot water inlet, and the mixing water outlet fluidly communicate with four neighboring holes in the enclosure.

11. The temperature adjustable water mixing valve of claim 10 wherein the lower ceramic chip is elliptical with four through-holes corresponding to the four holes in the enclosure,
wherein the upper ceramic chip is round with two flow slots on a left and right relative to a bottom surface of the lower ceramic chip,
wherein the flow slot on the left includes an arc slot extending to a second and third quadrants and a right angle slot communicating with the arc slot and extending along a X-axis and a positive Y-axis, and
wherein the flow slot on the right includes an arc slot extending to a first quadrant, another arc slot extending to the third quadrant, and a right angle slot communicating with the another arc slot and extending along the X-axis and the positive Y-axis.

12. The temperature adjustable water mixing valve of claim 10 wherein the upper and lower ceramic chips are round,
wherein the lower ceramic chip has four through-holes corresponding to the four holes in the enclosure,
wherein the upper ceramic chip has two flow slots at a top and bottom relative to an upper surface of the lower ceramic chip,
wherein the flow slot at the top includes sectors extending from a center circle to a middle of the first and the second quadrant and a right angle slot extending to a middle of the third quadrant, and
wherein the flow slot at the bottom is composed of arc slots extending to the third and fourth quadrants.

13. The temperature adjustable water mixing valve of claim 7, wherein the pressure relief channel is between the cold water inlet and the hot water inlet.

* * * * *